US011301357B1

(12) United States Patent
Gacek et al.

(10) Patent No.: US 11,301,357 B1
(45) Date of Patent: Apr. 12, 2022

(54) METHOD TO CHECK APPLICATION PROGRAMMING INTERFACE CORRECTNESS IN SOFTWARE

(71) Applicant: Amazon Technologies, Inc., Seattle, WA (US)

(72) Inventors: Andrew Jude Gacek, Maple Grove, MN (US); Neha Rungta, San Jose, CA (US); Lee Pike, Portland, OR (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/584,611

(22) Filed: Sep. 26, 2019

(51) Int. Cl.
*G06F 11/36* (2006.01)
*G06F 11/32* (2006.01)

(52) U.S. Cl.
CPC ........ *G06F 11/3608* (2013.01); *G06F 11/323* (2013.01); *G06F 11/3656* (2013.01)

(58) Field of Classification Search
CPC ... G06F 11/368; G06F 11/323; G06F 11/3656
USPC ................. 717/125–133, 140–145, 152–157
See application file for complete search history.

(56) References Cited

U.S. PATENT DOCUMENTS

| | | | | |
|---|---|---|---|---|
| 6,077,313 A * | 6/2000 | Ruf | ........................ | G06F 8/433 717/155 |
| 6,179,491 B1 * | 1/2001 | Choi | ..................... | G06F 9/4492 717/116 |
| 6,343,371 B1 * | 1/2002 | Flanagan | ................. | G06F 9/524 700/17 |
| 6,457,023 B1 * | 9/2002 | Pinter | ...................... | G06F 8/434 |
| 7,174,536 B1 * | 2/2007 | Kothari | ............... | G06F 11/3664 717/105 |
| 7,926,043 B2 * | 4/2011 | Vaswani | .............. | G06F 11/3466 717/130 |
| 7,962,901 B2 * | 6/2011 | McCamant | ......... | G06F 11/3612 717/131 |
| 8,171,473 B2 * | 5/2012 | Lavin | ........................ | G06F 9/44 718/1 |
| 8,327,339 B2 * | 12/2012 | Scholz | ...................... | G06F 8/70 717/132 |
| 8,527,965 B2 * | 9/2013 | Cifuentes | ............ | G06F 11/3604 717/131 |
| 8,549,490 B2 * | 10/2013 | Dolby | ....................... | G06F 8/73 717/133 |
| 8,732,669 B2 * | 5/2014 | Valdiviezo Basauri | .. | G06F 8/41 717/126 |

(Continued)

OTHER PUBLICATIONS

Taylor et al, "Anomaly Detection in Concurrent Software by Static Data Flow Analysis", IEEE, pp. 265-278 (Year: 1980).*

(Continued)

*Primary Examiner* — Anil Khatri
(74) *Attorney, Agent, or Firm* — Davis Wright Tremaine LLP

(57) ABSTRACT

Techniques for performing compile-time checks of source code using static analysis are described herein. One or more application programming interface calls to a remote computing service provider are detected in a set of source code listings using static analysis, and properties of each call are checked against a user-defined model containing rules defining incorrect behavior. If incorrect behavior is detected, a visualization is presented containing information about the incorrect behavior.

20 Claims, 8 Drawing Sheets

(56) References Cited

U.S. PATENT DOCUMENTS

| | | | | |
|---|---|---|---|---|
| 8,762,949 | B2 * | 6/2014 | Conway | G06F 8/73 717/126 |
| 8,799,874 | B2 * | 8/2014 | Pistoia | G06F 8/43 717/132 |
| 8,813,033 | B2 * | 8/2014 | Sreedhar | G06F 11/3608 717/124 |
| 8,856,764 | B2 * | 10/2014 | Pistoia | G06F 11/3604 717/154 |
| 8,881,293 | B1 * | 11/2014 | Brucker | G06F 8/75 726/25 |
| 8,887,131 | B2 * | 11/2014 | Beckwith | G06F 8/4434 717/108 |
| 8,918,772 | B1 * | 12/2014 | MacLachlan | G06F 8/54 717/154 |
| 9,569,341 | B1 * | 2/2017 | van Schaik | G06F 11/3672 |
| 9,584,874 | B1 * | 2/2017 | Farias | H04N 21/23424 |
| 10,275,333 | B2 * | 4/2019 | Shiraishi | G06F 11/008 |
| 10,303,464 | B1 * | 5/2019 | Wolfson | G06F 11/3664 |
| 10,769,250 | B1 * | 9/2020 | Tautschnig | G06F 8/436 |

OTHER PUBLICATIONS

Jovanovic et al, "Pixy: A Static Analysis Tool for Detecting Web Application Vulnerabilities", IEEE, pp. 1-6 (Year: 2006).*

Ayewah et al, "Using Static Analysis to Find Bugs", IEEE, pp. 22-29 (Year: 2008).*

Nagy, "Static Analysis of Data-Intensive Applications", IEEE, pp. 435-438 (Year: 2013).*

Guyer et al, "Free-Me: A Static Analysis for Automatic Individual Object Reclamation", ACM, pp. 364-375 (Year: 2006).*

Wiedermann et al, "Extracting Queries by Static Analysis of Transparent Persistence", ACM, pp. 199-210 (Year: 2007).*

Fisher et al, "Static Analysis for Syntax Objects", ACM, pp. 111-121 (Year: 2006).*

Medeiros et al, "Detecting and Removing Web Application Vulnerabilities with Static Analysis and Data Mining", IEEE, 54-69 (Year: 2016).*

\* cited by examiner

```
String my_secret_key = "wJalrXUtnFEMIK7MDENGbPxRfiCYEXAMPLEKEY";  ← 704

BasicWebCredentials webCreds = new BasicWebCredentials("access_key_id",
        ← 706                              my_secret_key); ← 708

DataStore dataStoreClient = DataStoreClientBuilder.standard()
        .withCredentials(new WebStaticCredentialsProvider(webCreds)) ← 710
        .build();
```

METHOD TO CHECK APPLICATION PROGRAMMING INTERFACE CORRECTNESS IN SOFTWARE

BACKGROUND

Modern computer systems make extensive use of network data storage and computing systems. Such use has proliferated in recent years, particularly in computer systems that rely on multiple computing resource service providers to share resources and implement libraries that perform operations and tasks associated with the computer systems. Such computing resource service providers frequently provide an application programming interface (API) to a service implementation or operations related to data storage so that such service implementations and data storage may be made available to a plurality of consumers. The computing resource service providers often leverage large-scale networks of computers, servers, and storage drives to enable customers to store data and perform operations for a variety of applications and services. The usage of such network computing and network data storage allows customers to efficiently and adaptively satisfy their varying computing needs, whereby the computing and data storage resources that may be required by the customers are added or removed from a large pool provided by a computing resource provider as requested.

This proliferation of network computing and network data storage provided by computing resource service providers, as well as the attendant increase in the number of entities dependent on network computing and network data storage, has increased the demand for security and policy enforcement by computing resource service providers. Because consumers have a large variety of network computing and network data storage needs, ensuring that security policy requirements for the computing resource service provider are enforced involves significant resources and, generally, can be a challenging endeavor.

BRIEF DESCRIPTION OF THE DRAWINGS

Various techniques will be described with reference to the drawings, in which:

FIG. 7 illustrates an example of incorrect API use in an example source code listing, according to at least one embodiment.

DETAILED DESCRIPTION

Figure 1:
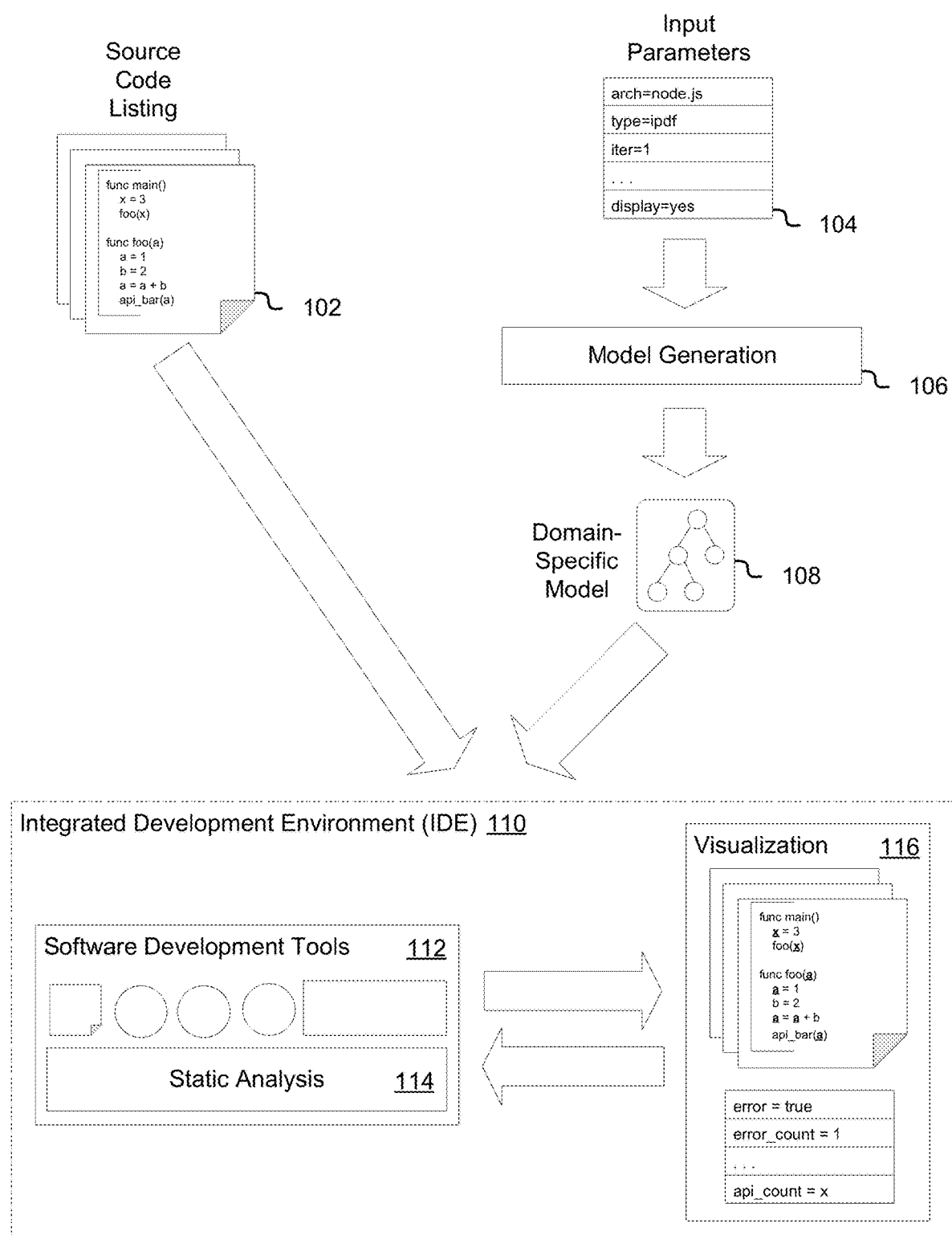
FIG. 1 illustrates an example environment for checking application programming interface (API) correctness according to at least one embodiment.

Remote computing services such as computing resource service providers often provide an application programming interface (API) so that consumers can leverage network computing and data resources in their software applications. The remote computing service leverages large-scale networks of computers, servers, and storage drives to enable customers to store data and perform operations for a variety of applications and services over a network. Consumers generally perform various computing steps in their own software, and then pass the information one or more API functions. The results of the API functions, after they perform some network computing operation, are then further used in the consumer's software. In general, computing resource service providers provide documentation illustrating best practices and associated security policy requirements for using their API functions. Because there is no enforcement mechanism to ensure that consumers strictly follow these best practices or security policy requirements, misuse of API function calls can lead to numerous problems for both consumers and computing resource service providers.

Enforcement of best practices and security and policy requirements for a computing service provider API can be readily accomplished by compile-time analysis of consumer software to ensure that it does not contain any policy violations. This compile-time analysis may locate API function calls in a consumer's source code listing, and warn the consumer of any potential misuse of API function calls or data associated with API function calls.

Techniques are described in the preceding and following description to manage the correctness of consumer use of API functions provided by a computing resource service provider, such as abiding by best practices and security policies. An API correctness tool analyzes consumer source code at compile time, and identifies if the consumer source code is in violation of any best practices and security policies. Specific best practices and security policies may be defined in a manner such that they can be verified across various computing architectures and in various software programming languages. If any best practices or security policies are violated by consumer use of an API provided by a computing resource service provider, information about the violation is provided to the source code author such that they can modify their use to conform to the best practices or security policies in violation.

An API correctness tool may be implemented as a component of an integrated development environment (IDE). An IDE, in various examples, is a software development tool that integrates numerous smaller software tools used in the software development process into a single larger tool. The IDE also automates the flow of information between the smaller tools and provides a graphical user interface for users. The smaller tools may comprise a compiler, a debugger, a profiler, and a source code editor. The smaller tools may optionally include multiple static analysis components implementing various static analysis techniques. The flow of information between these smaller tools may include object code and symbols, resource usage, errors, and configuration parameters for the compilation and debugging process. An IDE may also contain support for extensions and/or plugins. Extensions and/or plugins are separate, smaller software development tools that are not included with the IDE in general, but may be included on an individual basis by a software developer. An API correctness tool may be implemented as an extension or plugin of an IDE, or may be implemented as an integrated tool within an IDE.

An example API correctness tool according to this disclosure can analyze a source code listing to determine if the source code listing uses API function calls according to best practices and security policies. A source code listing is a list of instructions, generally in a single programming language, where the instructions tell describe an operation or series of operations to be performed by a computing system. The source code listing may include one or more files, and may be managed by an IDE. In an IDE, the source code listing is managed by a source code editor, and is compiled by a compiler into object code and executable code.

In a source code listing, application programming interface (API) calls are identified by an API correctness tool. An API call is a function call that provides a method by which a software developer can use the service implementations provided by a remote computing service such as a computing resource service provider. These function calls may be publicly available, or be limited to usage by software developers that have access privileges. In general, a computing resource service provider will make available documentation outlining how each API call is used, and various specific best use practices and considerations for use, such as security. An API correctness tool provides enforcement of these best use practices and considerations for use.

An API call may include input parameters that allow a consumer to provide the API call with information relating to their specific computing operation. These input parameters may include specific data values represented as general computing system data types, such as integer or floating point numbers, as well as more complicated data structures such as those defined by the computing resource service provider. A more complicated data structure, for example, may include sets of information of various data types in order to represent more detailed information.

An API correctness tool may look at the configuration of a set of input parameters for a specific API call. This configuration may include the type of data being provided as an input parameter, the order of input parameters, values of any individual parameter in a set of input parameters, or any other best use or security policy as specified by a computing resource service provider. An API correctness tool may also look at various characteristics of API calls. These characteristics may include the order in which API calls are made. The ordering of API calls may impact data at different points in a source code listing, and varying the order of API calls may or may not violate best use and security policies of a computing resource service provider. An API correctness tool may also look at the control structure of a source code listing in proximity to an API call. Control structure of a source code listing includes conditional statements such as "if then" as well as looping statements such as "for" and "while" loops. Additional control structures in a source code listing include branch statements, which are widely implemented on various computing systems, and include statements such as "go to" and other control-flow altering statements. Variations in the control structure of a source code listing in proximity to an API call may cause the source code to violate best practices and security policies of a computing resource service provider. For example, a conditional "if" statement immediately prior to an API call may, under certain circumstances, prevent the API call from taking place and effectively circumvent its purpose.

In order to enforce API correctness in a source code listing at compile-time, static analysis techniques may be used. Static analysis is a method for analyzing software programs and their source code without actually executing the software program. Static analysis can be performed on either a source code listing or the object code generated during compilation. Newer techniques in static analysis can be performed on machine (executable) code, though it is performed without execution.

In order to detect API calls in a source code listing, various static analysis techniques may be used. These static analysis techniques include, but are not limited to, program slicing, control flow analysis, constant propagation analysis, symbolic evaluation, inter-procedural finite distributive subset analysis, inter-procedural distributive environment analysis, inter-procedural dataflow analysis, and reaching definitions dataflow analysis. Dataflow analysis is a static analysis technique wherein a set of possible values is calculated for a data item, such as a variable in a source code listing, at various points in a software program. To accomplish this, a control-flow graph (CFG) is generated for a software program based on its source code listing. The CFG is a directed graph containing nodes for each instruction in a source code listing. Each node is connected by an edge (or visually, an arrow) to other instructions that can be reached during execution, and demonstrates possible instruction sequences in a source code listing that may be executed in a software program. A CFG may be constructed using various techniques, including static and dynamic analysis. In dataflow analysis, in order to determine a set of possible values for a data item at a point in a software program, a node in a CFG is found representing that point in the software program's source code listing. This node is and its parent nodes are analyzed to determine how they may impact data values associated with the node.

Reaching definitions dataflow analysis is an example of a dataflow analysis technique performed through static analysis. Reaching definitions dataflow analysis determines which definitions in a source code listing can each any given point in the source code listing. This is performed by, for example, iteratively traversing the edges of the control flow graph associated with a source code listing and determining the set of child nodes that can be reached from the source node containing the definition to be analyzed. Using reaching definitions dataflow analysis, an API correctness tool can identify API calls in a source code listing that can be reached from the entry point to the software program.

In order for an API correctness tool to analyze the input data to an API call, static analysis techniques that perform inter-procedural dataflow analysis may be used to determine data values at different points in a source code listing. In inter-procedural dataflow analysis, the value of data objects in a source code listing are computed as they change across function boundaries. The converse of inter-procedural dataflow analysis is intra-procedural dataflow analysis, wherein the value of data objects is tracked within the boundaries of a procedure (or function) definition in a source code listing. Reaching definitions dataflow analysis is an example of inter-procedural dataflow analysis. An API correctness tool utilizes inter-procedural dataflow analysis in order to check a broader set of instructions, representative of a whole program rather than inside of a single procedure, to ensure compliance with best practices and security policies as provided by a computing resource service provider.

Performing inter-procedural dataflow analysis on a source code listing allows for the identification of nodes in a control flow graph that contribute to a data value, such as a variable, at a given point in a source code listing. These nodes are called a program slice, and program slicing is the identification of these nodes across a whole software program and its source code listing. Program slicing reduces the amount of instructions in a source code listing that may be analyzed for API correctness. Instructions that contribute to the value of input data for API functions are identified and isolated through program slicing.

In order to ensure that a program slice represents as many possible instructions that can contribute to the value of input data for an API call, an additional static analysis technique called concolic execution may be used. Concolic execution is a software verification technique that combines symbolic execution with concrete execution to improve analysis of data values at a specific point in a source code listing. Symbolic execution is a technique whereby variables in a source code listing are represented by symbolic values, and their changes to a variable's value is monitored as it is handled by various instructions in a source code listing. Concrete execution is a technique where the value of variables is monitored as it is modified by instructions in a source code listing, where the initial value is set as a particular test value. In addition to improving program slice accuracy, concolic execution allows for a more thorough identification of possible values for input data to an API function at a specified point in a source code listing.

Best practices and security policies are determined by a computing resource service provider, and may be specified in an API correctness tool as user-defined properties. These user-defined properties include the specific rules associated with the best practices and security policies of a computing resource services provider, and may be implemented in a protocol-agnostic format such as an interface description language. An interface description language allows for a developer or computing resource service provider to define rules to enforce best practices and security policies in a format that can be used for application to any programming language that may be analyzed by an API correctness tool. An interface description language that is protocol-agnostic allows for adaptation of an API correctness tool to technologies, best practices, and security policies that evolve and have new behaviors and features over time.

Using an interface description language, a software developer or computing resource service provider can define rules implementing best practices and security policies. These rules are then synthesized, using various tools for synthesis of an interface description language, into a model that performs property checks on a source code listing. This model is specific to a given programming language or object code format, as opposed to the protocol-agnostic interface description language on which it is based. An API correctness tool can use the model and its property checks in combination with information gathered through static analysis, such as inter-procedural dataflow and program slices, to enforce requirements on a source code listing in an IDE.

If data inputs to an API call in a source code listing are not configured according to the model, or if the use of the API call is not configured according to the model, then the rules implementing best practices and security policies have been violated. If the best practices and security policies as determined by a computing resource service provider have been violated, then a visualization is presented in an IDE containing information relevant to the violation. This visualization may be a graphical user interface element, such as an alert or pop-up window, in an IDE. The visualization may also include source code highlighting in the source code listing of instructions that are relevant to the violation of the best practices and security policies. Source code highlighting includes visual identification of various instructions in a source code listing through underlining or changing the background color of a specific line of source code with a contrasting color. Information that may be displayed in a visualization includes the best practice or security policy that has been violated, the source code elements that are responsible for the violation, and suggestions for alleviating the violation.

In an illustrative example of API correctness, a source code listing performs an authentication of a data object. In authentication, at least one cryptographic key must be provided that represents the identity of the data object, and is unique to the data object. Because it is used to identify the data object, and is unique to the data object, its secrecy is paramount. Often, to simplify implementation of a software program, a source code listing may hardcode this key value into a data variable, and then provide that data variable as input to an API call that performs authentication of a data object. A computing resource service provider may decide that, as a best practice, key values are not allowed to be hardcoded in a source code listing.

Using an interface description language, a developer or computing resource service provider would define a protocol-agnostic ruleset stating that cryptographic keys may not be hardcoded, and must be obtained as a result of a computation or retrieved from a network data server. This protocol-agnostic ruleset is then used to generate a model specific to the programming language being used by a software developer to write the source code listing. When the software developer writing the source code containing this hardcoded cryptographic key attempts to compile their source code in an IDE, an API correctness tool will analyze their code for violations.

The API correctness tool begins by performing whole program static analysis to identify, using the techniques described above, any API calls provided by a computing resource service provider. Using additional static analysis techniques, such as inter-procedural dataflow analysis, the API correctness tool identifies instructions in the source code listing that contribute to the value of input data to the API call that performs authentication, in this example. Because the model is checking for hardcoded key values, additional static analysis techniques such as concolic execution that determine possible variations of input data values to an API call may not be necessary. Using the information obtained from inter-procedural dataflow analysis, the API correctness tool will use the model to determine that a cryptographic key value was hardcoded at some point in the source code listing prior to being used for authentication. Because this is a violation of the best practices and security policies provided by the computing resource service provider, the software developer will be alerted by a window containing information about the violation, and where in the source code listing the violation takes place, visualized through source code highlighting. Using this information, the software developer can then correct their source code listing accordingly.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates aspects of an example system for implementing aspects of an API correctness tool according to at least one embodiment. As will be appreciated, an IDE-based system 110 is used for purposes of explanation, and different systems may be used, as appropriate, to implement various embodiments. In at least one embodiment, a source code listing 102 comprises one or more source code files containing instructions for performing various operations on a computing system. The source code listing 102 may include one or more scripts or programs written in any programming language, such as Java®, C, C# or C++, or any scripting language, such as Ruby, PHP, Perl, Python or TCL, as well as combinations thereof, according to at least one embodiment.

In at least one embodiment, input parameters 104 are defined by a user, who may be a software developer, or provided by a computing resource service provider. Input parameters 104 may comprise rules specifying best practices and security policies for using API calls provided by a computing resource services provider, as well as other best practices and security policies for software development. Input parameters 104 may be implemented using an interface description language. Input parameters 104 may be implemented using the same interface description language that was used to define an API by a computing resource service provider. An interface description language allows for a protocol-agnostic generation of rules, definitions, and documentation for any programming language. Because it is protocol-agnostic, a single interface description language may be used in order to define best practices and security policies for any programming language used in a source code listing 102 that consumes API calls provided by a computing resource service provider.

Input parameters 104 defined in a protocol-agnostic interface description language are used to generate, using a model generation tool 106, a domain-specific model 108 that implements API correctness rules related to best practices and security policies for an API provided by a computing resource services provider. A model generation tool 106 take information such as rules for API correct usage defined in an interface description language corresponding to an API, and generates a domain-specific model 108. The domain-specific model 108 is generated such that it reflects the properties of an API call 104 that was generated using the same interface description language. The model generation tool 106 may output information that can be parsed by customized tools to refine the domain-specific model 108 for a specific application or API. A domain-specific model 108 implements rules and definitions representing best practices and security policies for consuming an API provided by a computing resource service provider. The domain-specific model 108 is specific to a programming language or architecture, and the model generation tool 106 converts input parameters 104 defined in a protocol-agnostic interface description language to a domain-specific model 108.

The domain-specific model 108 may implement any API correctness rule provided by a computing resource service provider. This includes, but is not limited to, data destruction requirements, API argument requirements, workflow requirements, restrictions for API use, and role and credential use. In at least one embodiment, an example of a data destruction requirement encoded in a domain-specific model 108 includes always destroying a plaintext key provided by an API call that generates cryptographic keys after the plaintext key is used. In at least one embodiment, another example of a data destruction requirement encoded in a domain-specific model 108 may also include destroying results from an API call to get secret values after the results are used. In at least one embodiment, another data destruction requirement encoded in a domain-specific model 108 may include destroying credentials from a function defining an authentication role after they are used.

In at least one embodiment, an example of an API argument requirement encoded in a domain-specific model 108 includes the enforcement of specific, standardized cryptographic key sizes, such as 256-bit keys, when using an API call for generating cryptographic keys. In at least one embodiment, another example of an API argument requirement encoded in a domain-specific model 108 includes always using materials provided by a trusted key management service or a trusted customer when using an API call directed to key generation. In at least one embodiment, an example of an API argument requirement encoded in a domain-specific model 108 includes requiring a specific number of days until a scheduled key deletion takes place for an API call directed to scheduled key deletion. In at least one embodiment, an example of an API argument requirement encoded in a domain-specific model 108 includes that a key from a key management service is always used when using an API call directed to the creation of a secret. In at least one embodiment, an example of an API argument requirement encoded in a domain-specific model 108 includes only using keys from a key management service, or only using keys that are not from a key management service, when specifying a cryptographic configuration for an API call directed to building an encryption client. In at least one embodiment, an example of an API argument requirement encoded in a domain-specific model 108 includes requiring all data uploaded into a network data storage system to be encrypted by a client making an API call to store data on a network data storage system. In at least one embodiment, an example of an API argument requirement encoded in a domain-specific model 108 includes requiring that any cryptographic plaintext information only exists in memory and is never stored on a data storage device or sent over a network. In at least one embodiment, an example of an API argument requirement encoded in a domain-specific model 108 includes tagging as sensitive any data that will be encrypted by an API call directed to data encryption. In at least one embodiment, an example of an API argument requirement encoded in a domain-specific model 108 includes ensuring that initialization vectors for API calls directed to cryptographic operations be safely randomly generated.

In at least one embodiment, an example of an API workflow requirement encoded in a domain-specific model 108 includes requiring that external key materials are securely imported using API calls directed to the secure importation of key materials. In at least one embodiment, an example of an API workflow requirement encoded in a domain-specific model 108 includes specifying that envelope encryption is preformed using API calls directed to secure key generation.

In at least one embodiment, an example of an API restriction requirement encoded in a domain-specific model 108 includes not allowing direct API calls to create infrastructure or modify network configuration. In at least one embodiment, an example of an API restriction requirement encoded in a domain-specific model 108 includes not allowing use of customer-deprecated API calls. In at least one embodiment, an example of an API restriction requirement encoded in a domain-specific model 108 includes not allowing eventual consistency. In at least one embodiment, an example of an API restriction requirement encoded in a domain-specific model 108 includes not allowing network data storage retrieval API calls to verify objects exist before network data storage objects are modified.

In at least one embodiment, an example of a role and credential use requirement encoded in a domain-specific model 108 includes enforcing use of a non-forgeable value as a role identifier when using an API call directed to role assumption. In at least one embodiment, an example of a role and credential use requirement encoded in a domain-specific model 108 includes enforcing that long-term credentials are never used when constructing clients to interact with a computing resource service provider. In at least one embodiment, an example of a role and credential use requirement encoded in a domain-specific model 108 includes requiring that only credentials from a trusted source are used when constructing clients to interact with a computing resource service provider.

The source code listing 102, in an embodiment, may be managed by an integrated development environment (IDE) 110. An IDE 110 may include, in at least one embodiment, a collection of software development tools 112, including a source code editor, a compiler, a profiler, a debugger, and additional tools provided as an add-on or plugin to the IDE 110. An IDE 110 may also include an implementation of static analysis techniques 114, including some of those techniques described above. Static analysis implementations 114 may be tightly integrated with an IDE 110 as a native software development tool, or included as an add-on or plugin. A system for enforcing API correctness will use the static analysis implementation 114 as part of the compile-time process performed by the software development tools 112 to verify that instructions contained in a source code listing 102 that are directed to API calls provided by a computing resource service provider follow the rules describing best practices and security policies as encoded in a domain-specific model 108.

In at least one embodiment, if the instructions contained in a source code listing 102 directed to API calls provided by a computing resource service provider do not follow the rules encoded in a domain-specific model 108, then the IDE 110 performs a visualization 116 that identifies incorrect API usage. The visualization 116 may contain, in an embodiment, warnings including source code highlighting demonstrating traces through the source code listing 102. The visualization 116 may further contain, in an embodiment, concrete inputs as described above that show the violation of best practices and security policies as encoded in the domain-specific model 108. The visualization 116 may contain, when available, additional information related to best practices and security policies as encoded in the domain-specific model 108, including links to documentation of best practices for API usage.

Figure 2:
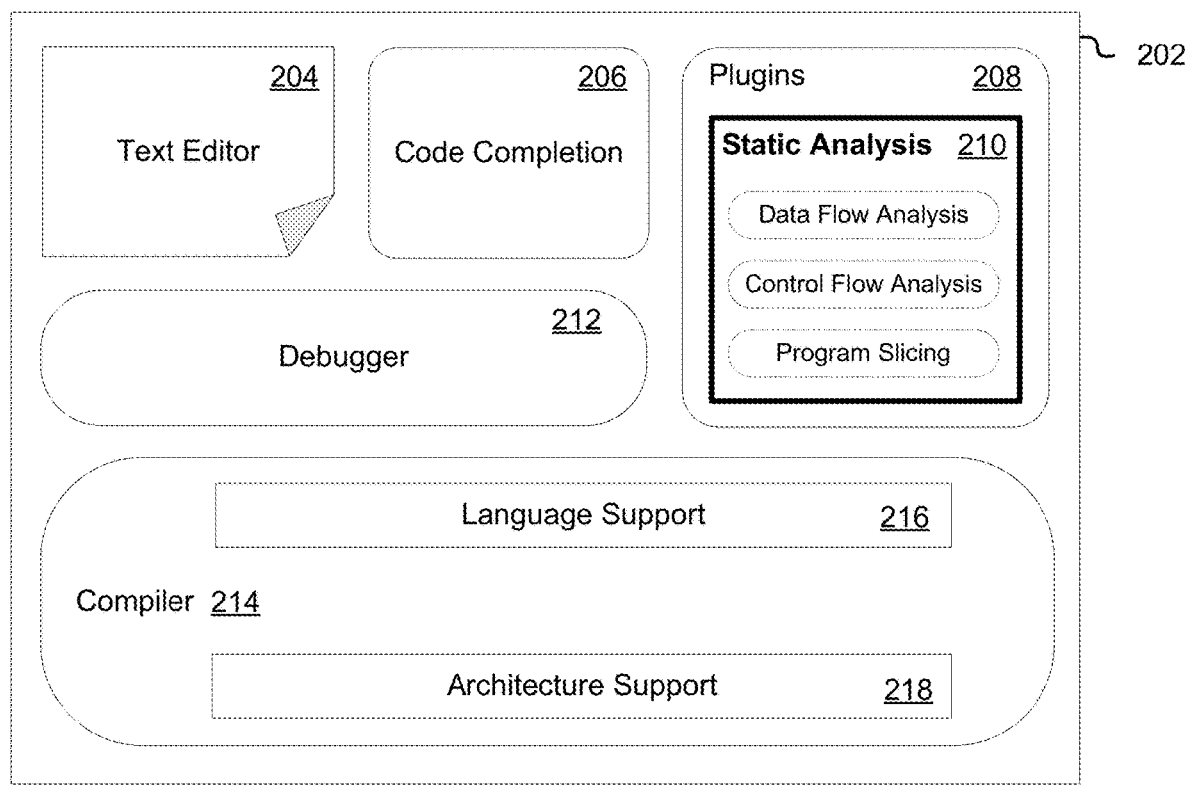
FIG. 2 illustrates an example integrated development environment (IDE) containing for support for check API correctness with static analysis, according to at least one embodiment.

FIG. 2 illustrates an integrated development environment (IDE) 202 according to at least one embodiment. An IDE 202 may contain a text editor 204 for writing and editing source code in any programming language, including those described above. The source code in the text editor 204 may include function calls to an API provided by a computing resource service provider. The text editor 204 may provide facilities to assist in software development, including source code highlighting and documentation related to a programming language. The IDE 202 may contain a module for code completion 206. The code completion module 206 allows for auto-completion of instructions as they are written in the text editor 204 by a software developer. The code completion module 206 may also provide information during software development relevant to specific high level programming languages, including those identified above.

In at least one embodiment, an IDE 202 may include the ability to integrate plugins 208 into software development. Plugins 208 provide additional functionality to the IDE 202, including static analysis 210. Static analysis 210 includes the methods described above in order to identify characteristics of a source code listing contained in a text editor 204. These characteristics may include control flow throughout a source code listing, or how data is manipulated. This information, according to at least one embodiment, may include data values at any point in a source code listing in a text editor 204. Static analysis facilitates the identification of API calls in a source code listing in a text editor 204, and allows for the IDE 202 to validate the correctness of API calls to a computing resource service provider.

In at least one embodiment, a debugger 212 may be included in an IDE 202. A debugger 212 may provide facilities for tracking data values and stepping through source code in a text editor 204 in order to locate mistakes in the source code listing. A compiler 214 takes source code in a text editor 204 and converts it to object code according to a language support module 216. This language support module 216 includes information that allows a compiler to take a high level programming language, as contained in the source code listing in the text editor 204, and convert it into object code. This object code is an intermediate representation of instructions in a source code listing in a text editor 204, where the source code listing is in, according to at least one embodiment, a high level programming language. The object code contains instructions and symbols that represent the source code and data values of the source code listing in the text editor 204. The compiler 214 uses the object code to generate executable code according to a specific computing system architecture. The compiler uses, in at least one embodiment, an architecture support module 218 containing information about the available executable code instructions on a specific computing system.

Figure 3:
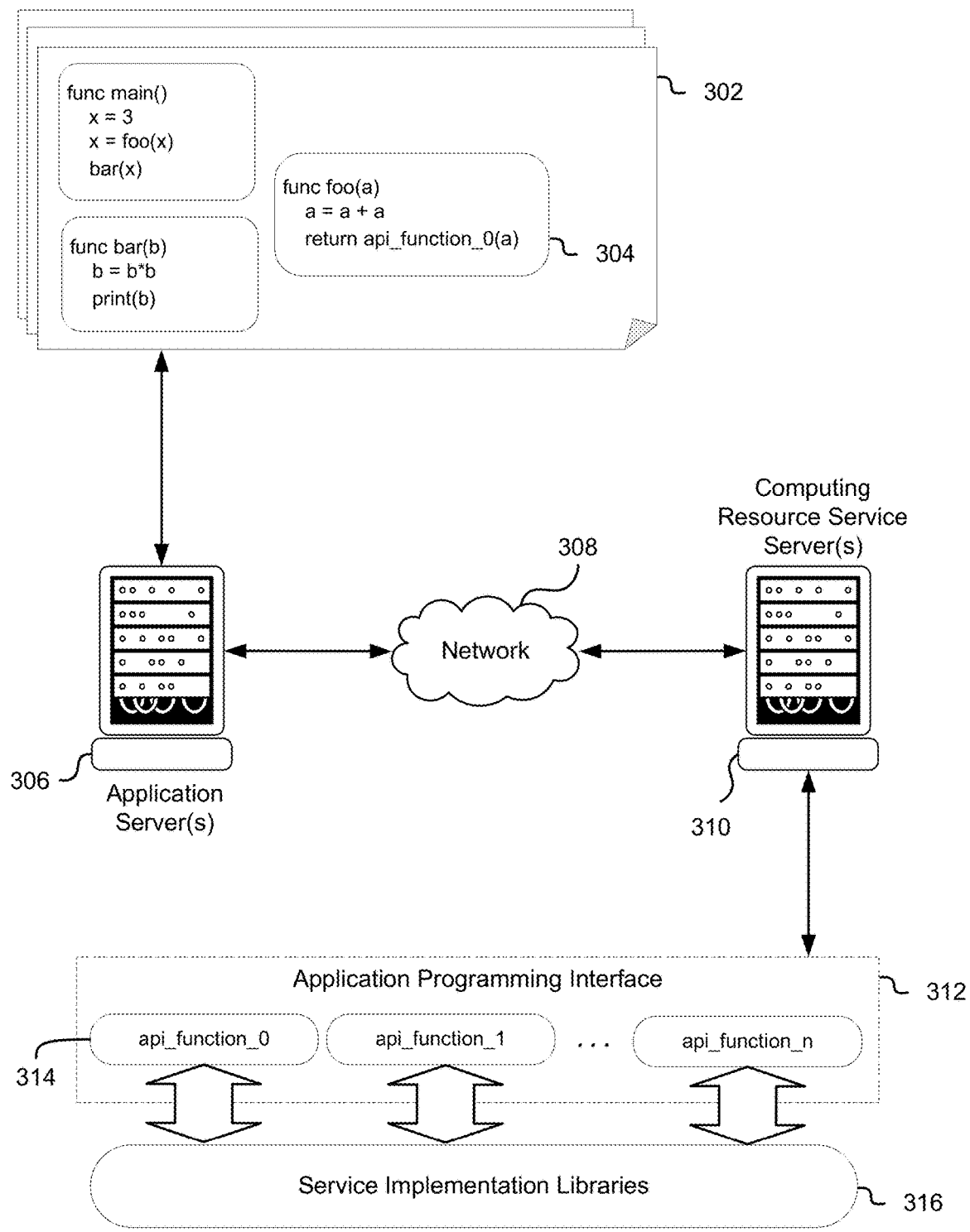
FIG. 3 illustrates an example of an API call in a source code listing, where the API call is directed to a computing resource service provider, according to at least one embodiment.

FIG. 3 illustrates an example application programming interface (API) call 304 in a source code listing 302 according to an embodiment. A source code listing 302 contains instructions in a programming language including those as describe above. A source code listing 302, according to at least one embodiment, may include a function call 304 to an API provided by a computing resource service provider 310. A source code listing 302, according to at least one embodiment, may be compiled and executed by one or more application servers 306 on a network 308. The one or more application servers 306 may contain one or more executable programs compiled from various source code listings 302 each containing one or more API calls 304 to one or more computing resource service providers 310.

One or more application servers 306 may include web application servers or any type of application server capable of executing a software program compiled from a source code listing 302 containing one or more API calls 304. One or more application servers 306 may communicate over a network 308 with one or more computing resource service provider servers 310. A network 308 may include, according to at least one embodiment, the World Wide Web, intranets, extranets, external devices, or any other type of computing network. A network 308 may utilize various network communication protocols including TCP/IP, UDP, Bluetooth, 802.11, or any other type of network communication protocol.

One or more computing resource service servers 310 may provide computing services of one or more computing resource service providers, according to an embodiment. These computing services may include, according to at least one embodiment, an application programming interface (API) 312 that provides access to computing resource services on one or more computing resource service servers 310. The API 312 may implement one or more API functions 314 that provide a public interface to service implementation libraries 316. The one or more API functions 314 may provide a consumer source code listing 302 compiled and executed on one or more application servers 306 with network computing or network data storage services through one or more computing resource service servers 310. The network computing or network data storage services provided by an API 312 may be implemented in one or more service implementation libraries 316.

Figure 4:
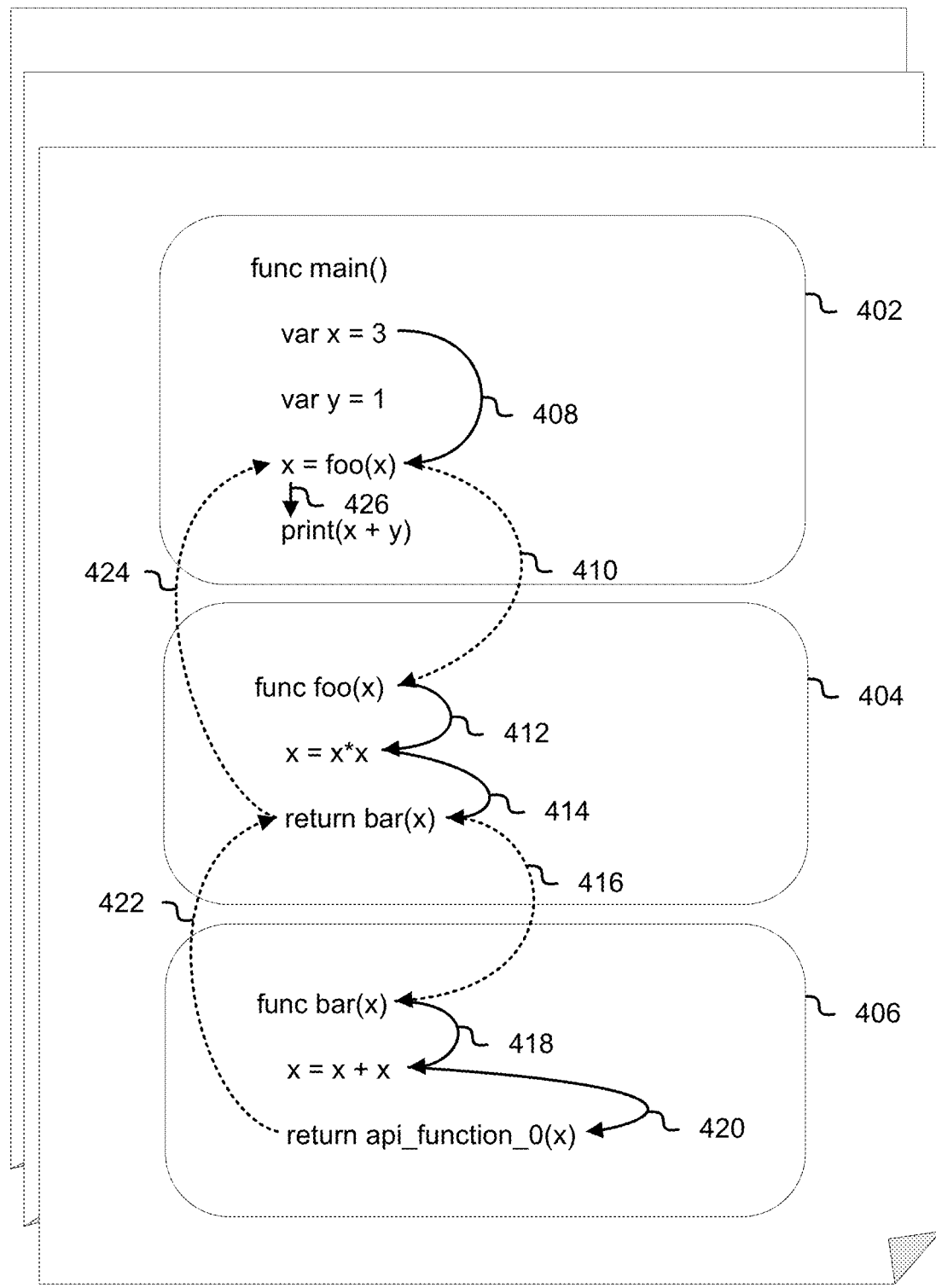
FIG. 4 illustrates an example of inter-procedural data flow in an example source code listing according to at least one embodiment.

FIG. 4 illustrates, according to at least one embodiment, inter-procedural data flow from a main function (or procedure) "func main( )" 402 to subsequent functions "func foo(x)" 404 and "func bar(x)" 406, and back to the main function "func main( )" 402. An initial data object is created in the main function "func main ( ) 402 with an identifier "x" and an initial value of 3. The data object "x" is used by the instruction "x=foo(x)" and the data flows 408 from the declaration "var x=3" to the instruction "x=foo(x)." Because the data flow is inter-procedural, or flows between procedures or function calls, the value of "x" flows 410 to the declaration of function "func foo(x)" 404.

In function "func foo(x)" 404, "x" is an input parameter and flows 412 to the instruction "x=x*x." The data contained in "x" then flows 414 to the return instruction for function "func foo(x)" 404. The return instruction for function "func foo(x)" is dependent on the return instruction value of a call to another function "func bar(x)," and the data contained in "x" flows 416 inter-procedurally to the declaration of function "func bar(x)" 406.

In function "func bar(x)" 406, "x" is an input parameter and flows 418 to the instruction "x=x+x." The data contained in "x" then flows 420 to the return instruction for function "func bar(x)" 406. The return instruction for function "func bar(x)" is dependent on an API call "api_function_0($x$)" that takes as an input parameter the data value "x" and is provided by a computing resource service provider as described above.

The data value received or otherwise obtained from the API call "api_function_0($x$)" to a computing resource service provider then flows 422 from the return instruction for function "func bar(x)" 406 inter-procedurally to the return instruction for function "func foo(x)" 404. The data value from the return instruction for function "func foo(x)" 404 then flows 424 inter-procedurally to the instruction "x=foo (x)" in function "func main( )" 402, and the data value for "x" in function "func main( )" 402 is updated. The data value for "x" in function "func main( )" 402 then flows 426 to instruction "print(x+y)" in function "func main( )" 402.

Inter-procedural data flow illustrated in FIG. 4 is determined, according to at least one embodiment, through various static analysis techniques. These techniques, in an embodiment, may include identification of inter- and intra-procedural control flow graphs as described above. Control flow graphs can then be used to identify API calls in a source code listing as described above, as well as generate program slices according to at least one embodiment.

Figure 5:
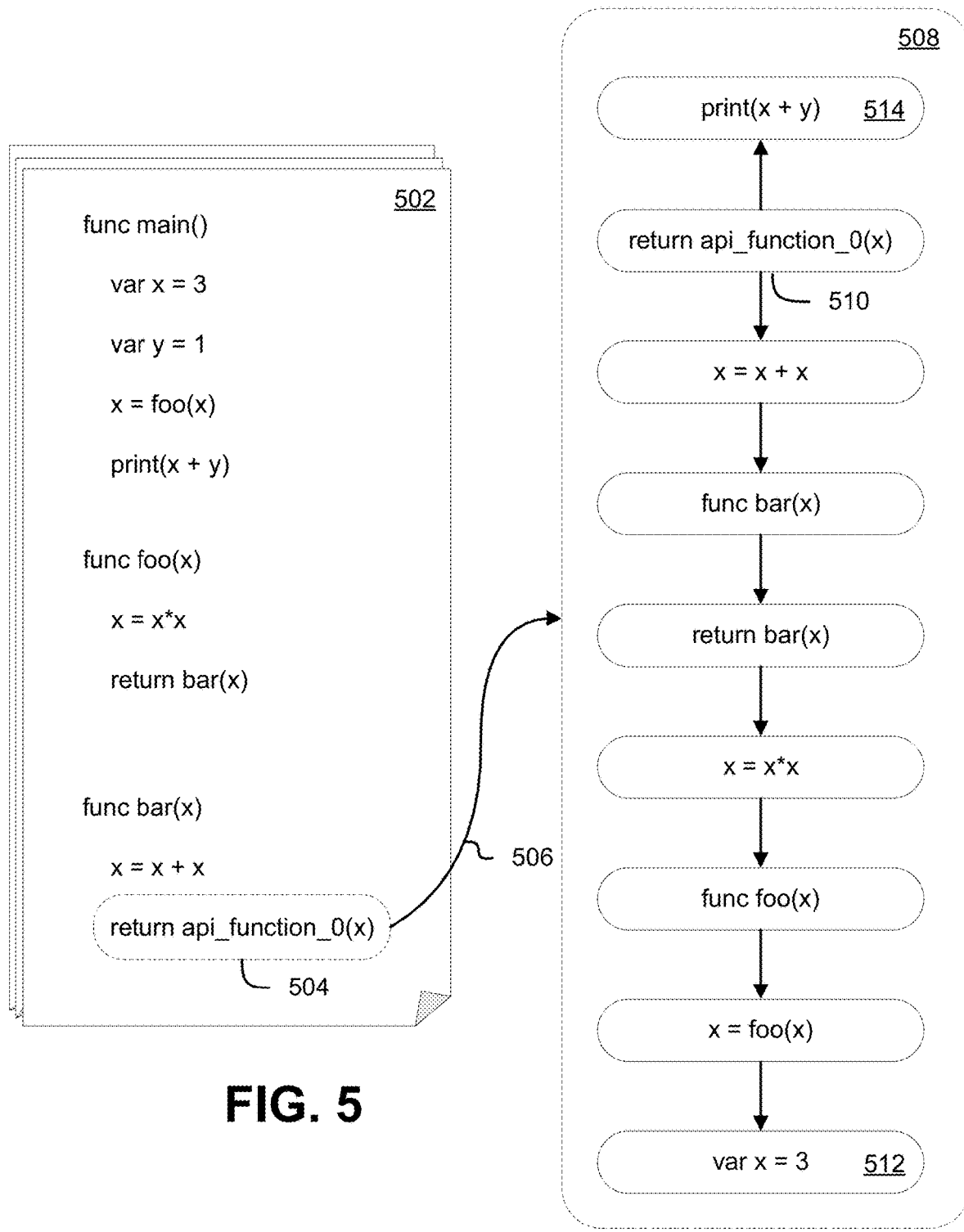
FIG. 5 illustrates an example of program slicing according to inter-procedural data flow in an example source code listing according to at least one embodiment.

FIG. 5 illustrates a program slice 508 for an API call 504 provided by a computing resource service provider in a source code listing 502, according to an embodiment. A program slice may be determined by static analysis techniques applied to a source code listing 502 as described above. Static analysis techniques, including reaching definitions dataflow analysis as described above, may be used to identify function calls to an API 504 in a source code listing 502. In an embodiment, further static analysis techniques, including generation of control flow graphs and inter-procedural dataflow analysis, as described above, may be used to identify the instructions 508 in a source code listing 502 that may use or modify a data value 512.

According to at least one embodiment, when an API call 504 to a computing resource service provider is determined through a static analysis technique, a program slice 508 may be generated 506 containing nodes in a directed graph representing instructions from a source code listing 502 that use or modify the input data parameters to the API call 504. A program slice 508 contains, in an embodiment, a node representing the API call 510 to a computing resource service provider, as well as instructions that use or modify a data value prior to the API call 510, including the initial definition of the data value 512. A program slice 508 may also contain, in an embodiment, instructions 514 in a source code listing 502 that use data that is dependent on the value returned by the API call 510 to a computing resource service provider.

A program slice 508 may be used, in an embodiment, for checking API correctness in a source code listing 502. A program slice 508 contains the instructions that use or modify a data value 512 that becomes an input parameter to an API call 510. In at least one embodiment, using various static analysis techniques, as described above, allows an API correctness tool to determine how a data object is used and that a data object's value conforms to user-defined properties 104 encoded in a domain-specific model 108. In an embodiment, a data value may also be varied in a data object 512 using further static analysis techniques, including concolic execution as described above. The further static analysis techniques, including concolic execution, allow an API correctness tool to check possible variations of data values for a data object 512 against requirements encoded in a domain-specific model 108.

Figure 6:
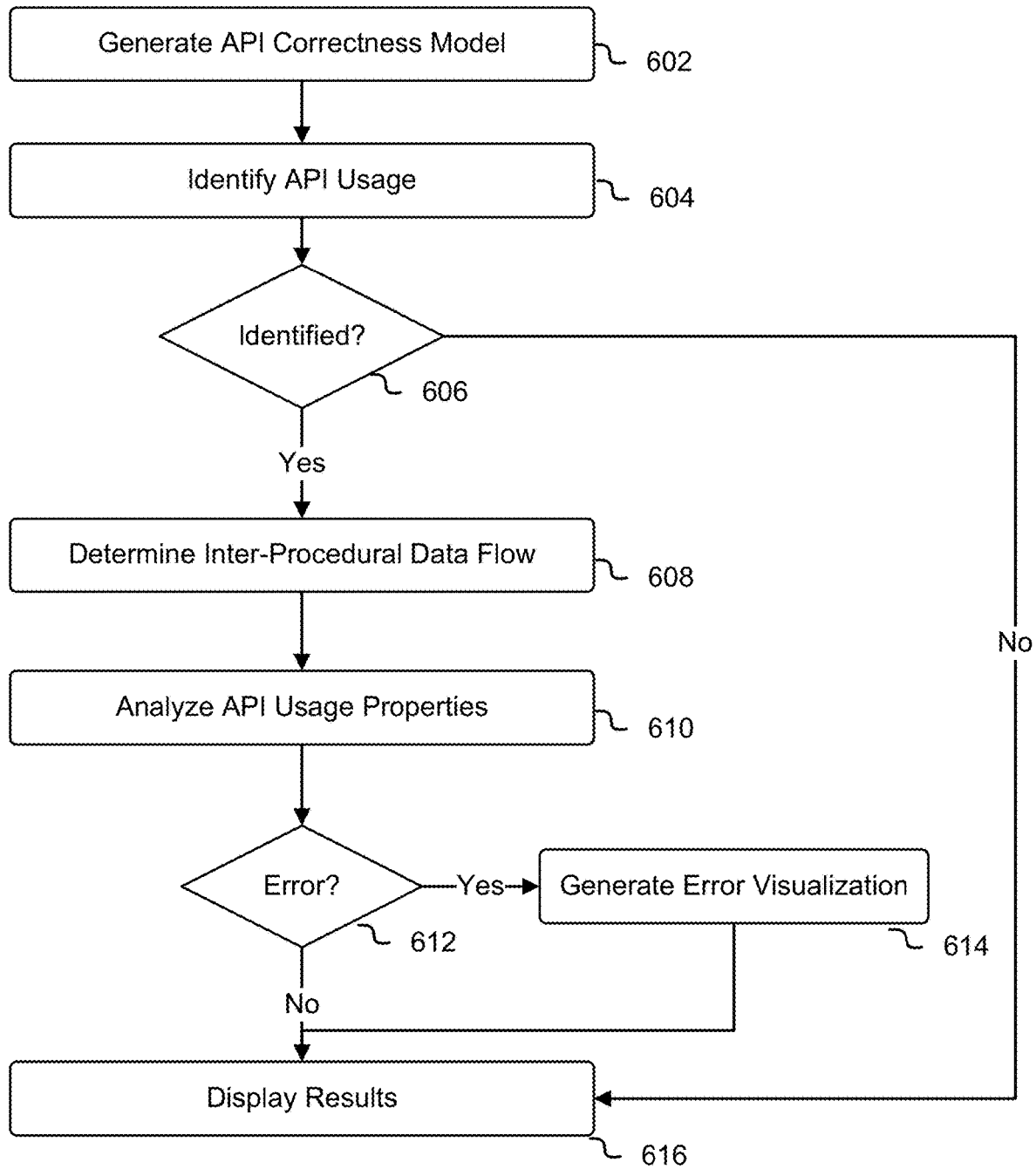
FIG. 6 illustrates an example process for performing checks on API correctness using the methods described herein, according to at least one embodiment.

FIG. 6 illustrates a process for checking API correctness performed by an API correctness tool tightly integrated into an IDE, according to at least one embodiment. A domain-specific model 108 is generated 602 by a model generator 106 from a set of user-defined properties 104 defined in a protocol-agnostic interface description language. This domain-specific model 108, in an embodiment, contains requirements related to best use and security policies provided by a computing resource service provider. In a source code listing 102, according to an embodiment, one or more API calls to a computing resource service provider are identified 604 using static analysis techniques including those described above by a static analysis module 114 in an IDE 110. In an embodiment, if no API calls to a computing resource service provider are identified 606, then results are displayed 616 in an integrated development environment (IDE) 110 indicating that no API calls to a computing resource service provider were identified.

If API calls to a computing resource service provider are identified 606 using various static analysis techniques described above, additional static analysis techniques also described above are used to determine inter-procedural data flow 608 for the input data parameters to the API call. The configuration and use of input data parameters are analyzed 610, in an embodiment, to determine if the configuration and use of input data parameters follow requirements encoded in a domain-specific model 108. Further static analysis techniques, such as concolic execution as described above, may be utilized in an embodiment in order to analyze 610 the different possible data values that input parameters to an API call may contain. If the configuration and use of input data parameters as determined during analysis 610 conform to the requirements specified in a domain-specific model 108, then results are displayed 616 indicating that no API correctness issues were found.

If, in an embodiment, the configuration and use of input data parameters to an API call as determined during analysis 610 do not conform 612 to the requirements specified in a domain-specific model 108, then information pertaining to the misconfiguration and misuse of input data parameters to an API call are generated 614 and displayed 616. In an embodiment, these results are displayed in an integrated development environment 110. The information pertaining to the misconfiguration and misuse of input data parameters to an API call may contain, in at least one embodiment, source code highlighting illustrating traces of instructions contained, for example, in a program slice for an input data parameter to an API call. Additional information to be displayed 616 pertaining to the misconfiguration and misuse of input data parameters to an API call may contain, in an embodiment, links to documentation relevant to the requirements encoded in the domain-specific model 108. Additional information to be displayed 616 pertaining to the misconfiguration and misuse of input data parameters to an API call may contain, in an embodiment, suggested modifications to a source code listing 102 in order to ensure that the API calls in a source code listing 102 conform to the requirements encoded in the domain-specific model 108.

FIG. 7 illustrates an example of an API misuse 710 in a source code listing 702 according to at least one embodiment. A common security rule provided by a computing resource service provider is that cryptographic keys should not be stored as static values or as plaintext values in a source code listing prior to their use in an API call, or in general. In FIG. 7, a cryptographic key is specified as a static, plaintext value 704 in a source code listing 702.

A credentials object 706 is created to represent a user, and when creating that object the static, plaintext key 704 is used 708. The credentials object 706 is then passed to an API call to a computing resource service provider 710 in order to obtain, from the computing resource service provider, an object representing network data storage.

In an embodiment, a computing resource service provider may provide rules defined in a protocol-agnostic interface description language concerning use of plaintext cryptographic data objects as input to an API call in a source code listing 702. Using the process illustrated in FIG. 6, when a software developer compiles the source code listing 702, an API correctness tool will identify the API call 710 and create a program slice using various static analysis techniques as described above. This program slice would contain the API call 710, the credential object 706, the input parameters to the credential object creation function 708, and the data object definition 704. In an embodiment, additional static analysis techniques are used, as described above, to identify that the input data parameter 710 to an API call is dependent on a static, plaintext value 704, which is in violation of the rules defined in the protocol-agnostic interface description language and an incorrect API usage. In an embodiment, a visualization in the IDE being used to compile the source code listing 702 would be presented illustrating a trace of the instructions 704, 706, 708, and 710 that violate the rules provided by the computing resource service provider. In an embodiment, links to documentation relevant to the API call 710 may also be presented in the visualization so that the software developer may make the correct changes to the source code listing 702.

As one skilled in the art will appreciate in light of this disclosure, certain embodiments may be capable of achieving certain advantages, including some or all of the following: (1) improved security in computing systems that rely on network computing resources or network data storage provided by a computing resource service provider; (2) improved control by a computing resource service provider that consumers follow best practices when using their network computing resources or network data storage; and (3) improved stability and security in computing and data storage systems used by a computing resource service provider.

Figure 8:
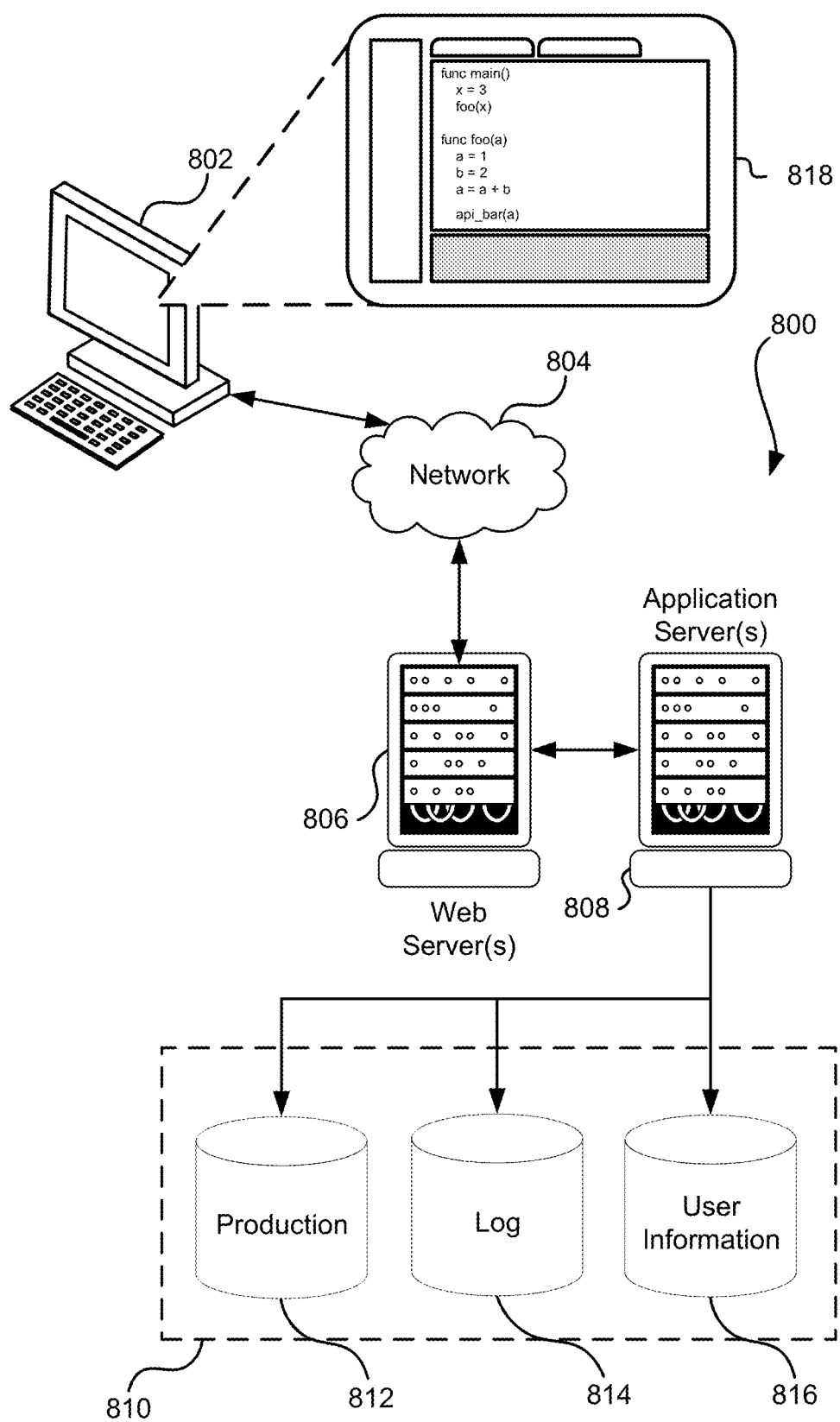
FIG. 8 illustrates a system in which various embodiments can be implemented.

FIG. 8 illustrates aspects of an example system 800 for implementing aspects in accordance with an embodiment. As will be appreciated, although a web-based system is used for purposes of explanation, different systems may be used, as appropriate, to implement various embodiments. In an embodiment, the system includes an electronic client device 802, which includes any appropriate device operable to send and/or receive or otherwise obtain requests, messages, or information over an appropriate network 804 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, electronic client device 802 may include software development tools including an integrated development environment 818 capable of checking application programming interface correctness as described above.

In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 806 for receiving requests and serving content in response thereto, although for other networks an alternative device serving a similar purpose could be used as would be apparent to one of ordinary skill in the art.

In an embodiment, the illustrative system includes at least one application server 808 and a data store 810, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 802 and the application server 808, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 810, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 812 and user information 816, which are used to serve content for the production side. The data store also is shown to include a mechanism for storing log data 814, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 810.

The data store 810, in an embodiment, is operable, through logic associated therewith, to receive instructions from the application server 808 and obtain, update or otherwise process data in response thereto, and the application server 808 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 802. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 800 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 800, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer implemented method, comprising:
   under the control of an integrated development environment based on one or more computer systems configured with executable instructions,
   analyzing a source code listing to identify, based on a set of static analysis activities, at least one application programming interface call to a remote computing service, where the application programming interface call is in a the source code listing in the integrated development environment, and the set of static analysis activities includes analyzing the value of a data object in the source code listing across function boundaries;

determining, for the at least one application programming interface call to a remote computing service, a set of input parameters, the set of input parameters including the data object;

receiving a set of user defined properties, the set of user defined properties identifying a configuration of the set of input parameters;

generating, from the set of user defined properties, a model for checking the configuration of the set of input parameters;

detecting, based on the set of static analysis activities, whether the set of input parameters is in accordance with the model; and displaying a graphical user interface element in the integrated development environment, the graphical user interface element containing information about whether the set of input parameters is in accordance with the model.

2. The computer-implemented method of claim 1, wherein the at least one application programming interface call to a remote computing service is directed to a computing resource service provider.

3. The computer-implemented method of claim 1, wherein:
the user-defined properties are specified in an interface description language; and
the model is domain-specific.

4. The computer-implemented method of claim 1, wherein the set of static analysis activities comprises an inter-procedural data flow analysis.

5. A system, comprising:
one or more processors; and
memory that stores computer executable instructions that are executable by the one or more processors to cause the system to:
analyzing a source code listing to identify, based on a set of static analysis activities, a function call to a remote computing service, the function call performed in the source code listing, and the set of static analysis activities includes inter-procedural dataflow analysis of the source code listing;
determine, for the function call to a remote computing service, a set of input parameters;
obtain a set of user defined properties generated according to an interface description language used to define the function call to a remote computing service;
generate, from the set of user defined properties, a model;
determine, based on the set of static analysis activities, that the input parameters are in accordance with the model; and
generate a visualization.

6. The system of claim 5, wherein the source code listing is a component of an integrated development environment.

7. The system of claim 5, wherein the function call is an application programming interface call to a remote computing service provided by a computing resource service provider.

8. The system of claim 5, wherein the user-defined properties are specified in an interface description language.

9. The system of claim 5, wherein the visualization is a component of an integrated development environment, the visualization further comprising:
traces in the source code listing; and
information directed to input parameters that are not in accordance with the model.

10. The system of claim 5, wherein the set of static analysis activities comprises inter-procedural control flow analysis.

11. The system of claim 5, wherein the set is a first set of input parameters and the set of static analysis activities comprises:
inter-procedural dataflow analysis; and
concolic execution to determine a second set of input parameters.

12. The system of claim 11, wherein the second set of input parameters are at least partially based on the first set of input parameters.

13. A non transitory computer readable storage medium storing thereon executable instructions that, as a result of being executed by one or more processors of a computer system, cause the computer system to at least:
obtain a set of user defined properties related to an application programming interface provided by a remote computing service;
generate, from the set of user defined properties, a model;
analyzing a set of source code listings to identify, based at least in part on a set of static analysis activities, a set of function calls in a the set of source code listings, the set of static analysis activities including analysis of one or more changes to a value of a data object in the set of source code listings across a function boundary;
identify, for each function call of the set of function calls, a characteristic of the function call, the characteristic of the function call based at least in part the value of the data object;
determine, based at least in part on the set of static analysis activities, that the characteristic of each function call of the set of function calls is in accordance with the model; and
as a result of the characteristic of any function call of the set of function calls not being in accordance with the model, generate a visualization.

14. The non-transitory computer-readable storage medium of claim 13, wherein the instructions further comprise instructions that, as a result of being executed by the one or more processors, cause the computer system to identify the characteristic of each function call of the set of function calls, where the characteristic is a position of the function call in the set of function calls.

15. The non-transitory computer-readable storage medium of claim 13, wherein the instructions further comprise instructions that, as a result of being executed by the one or more processors, cause the computer system to identify the characteristic of each function call of the set of function calls, where the characteristic is a set of control structures in proximity to the function call.

16. The non-transitory computer-readable storage medium of claim 13, wherein the instructions that cause the computer system to generate a visualization further include instructions that cause the computer system to display hyperlink information in the source code listing.

17. The non-transitory computer-readable storage medium of claim 13, wherein the instructions that cause the computer system to generate a visualization further include instructions that cause the computer system to display information about a characteristic of a function call of the set of function calls that fails to be in accordance with the model.

18. The non-transitory computer-readable storage medium of claim 13, wherein the instructions that cause the computer system to perform a static analysis activity from the set of static analysis activities further include instructions for program slicing.

19. The non-transitory computer-readable storage medium of claim 13, wherein the instructions that, as a result of being executed by the one or more processors, cause the computer system to identify the set of function calls, where each function call of the set of function calls is directed to an application programming interface provided by a remote computing service over a network.

20. The non-transitory computer-readable storage medium of claim 13, wherein the instructions further comprise instructions that, as a result of being executed by the one or more processors, cause the computer system to identify the characteristic of each function call of the set of function calls, where the characteristic is a set of input parameters to the function call.

\* \* \* \* \*